(12) United States Patent
Cornolti et al.

(10) Patent No.: US 8,151,951 B2
(45) Date of Patent: Apr. 10, 2012

(54) DISC BRAKE CALIPER WITH A COOLING DUCT

(75) Inventors: Raffaello Cornolti, Sorisole (IT); Riccardo Arrigoni, Gorgonzola (IT); Silvio Persico, S. Paolo d'Argon (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 1132 days.

(21) Appl. No.: 11/571,381

(22) PCT Filed: Sep. 29, 2004

(86) PCT No.: PCT/IT2004/000535
§ 371 (c)(1), (2), (4) Date: Feb. 14, 2007

(87) PCT Pub. No.: WO2006/035464
PCT Pub. Date: Apr. 6, 2006

(65) Prior Publication Data
US 2008/0277216 A1    Nov. 13, 2008

(51) Int. Cl.
*F16D 65/847* (2006.01)
(52) U.S. Cl. ............. 188/264 AA; 188/71.6; 188/73.31; 188/264 A; 188/264 CC; 188/264 D; 188/264 P; 188/250 B
(58) Field of Classification Search ............ 188/264 AA, 188/264 A, 264 W, 264 R, 260, 72.4, 264 E, 188/218 XL, 71.6; D12/180
See application file for complete search history.

(56) References Cited

U.S. PATENT DOCUMENTS

| | | | | |
|---|---|---|---|---|
| 3,277,985 A * | 10/1966 | Caskey | ............... | 188/264 AA |
| 4,440,270 A * | 4/1984 | Ross | ............... | 188/264 AA |
| 5,394,963 A * | 3/1995 | Deane et al. | ............... | 188/73.31 |
| 5,445,242 A * | 8/1995 | Pogorzelski et al. | ............... | 188/71.6 |
| 5,558,183 A * | 9/1996 | Way | ............... | 188/71.6 |
| 5,671,827 A * | 9/1997 | Demetriou et al. | ............... | 188/71.6 |
| 6,357,563 B1 | 3/2002 | Hayford et al. | | |
| 6,446,766 B1 | 9/2002 | Cornolti et al. | | |

FOREIGN PATENT DOCUMENTS

| | | |
|---|---|---|
| EP | 1016804 | 7/2000 |
| EP | 1234996 | 8/2002 |
| FR | 1548561 | 12/1968 |
| JP | 57-190140 | 12/1982 |
| JP | 61-3767 | 1/1986 |
| JP | 03194226 | 8/1991 |
| JP | 2000-213576 | 8/2000 |
| WO | 00/09373 | 2/2000 |
| WO | 03/058088 | 7/2003 |

* cited by examiner

Primary Examiner — Robert Siconolfi
Assistant Examiner — San Aung
(74) Attorney, Agent, or Firm — Shoemaker and Mattare

(57) ABSTRACT

A disc brake caliper comprising a suspension side portion, facing an associable suspension to support said caliper, a wheel side portion facing a wheel being rotatably integrally associable to a brake disc, said wheel side and suspension side portion comprising cylinders suitable to house pistons facing pads for breaking the brake disc, and being connected by at least one connecting bridge extending astride the brake disc. The caliper comprises at least one casing being associable to a side surface of said caliper opposite a housing recess of the brake disc, such as to define a duct extending between said suspension side and wheel side portion to convey a cooling air steam, near thrust portion of the pads being affected by the relative pistons.

33 Claims, 19 Drawing Sheets

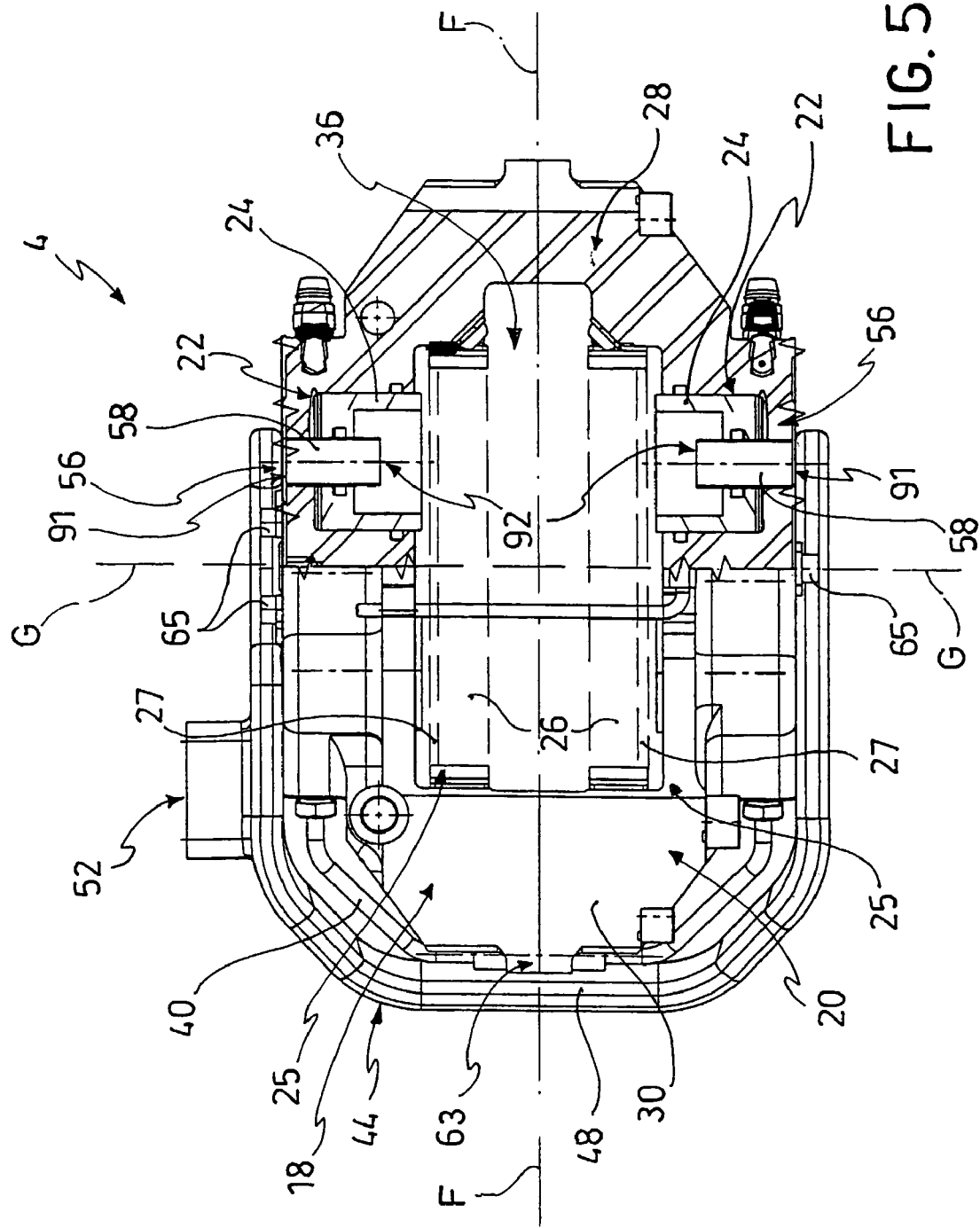

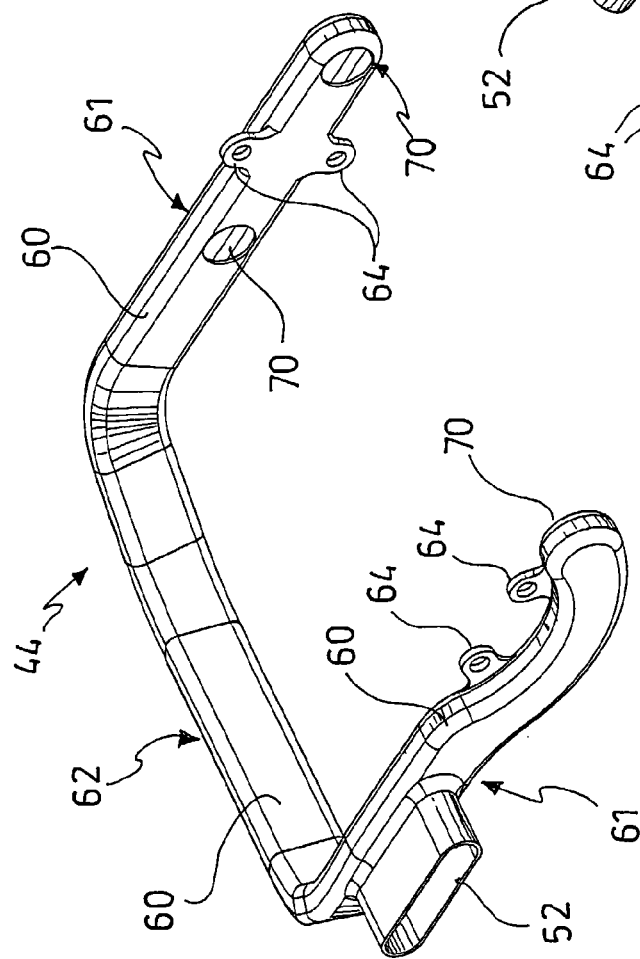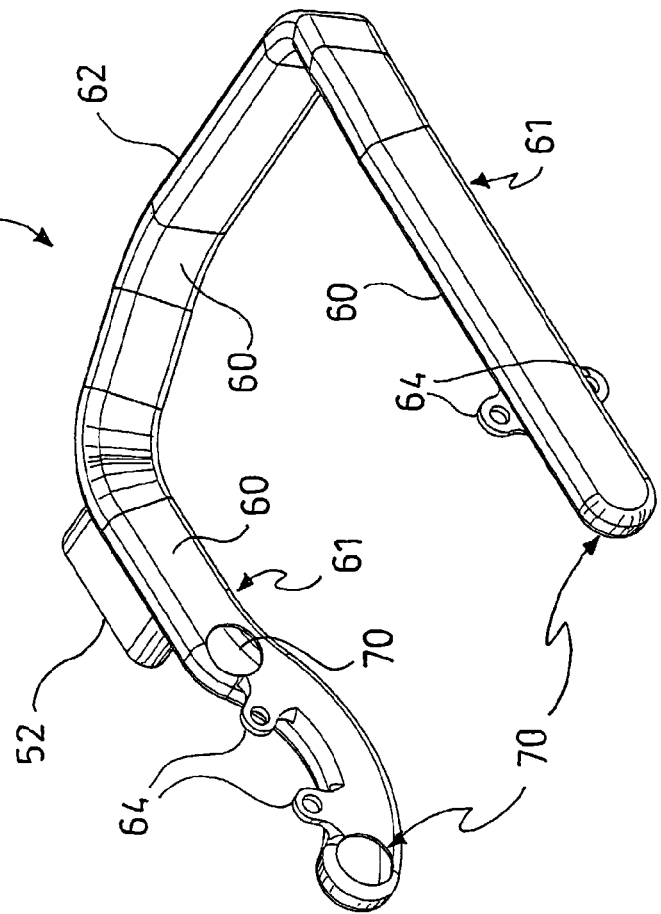

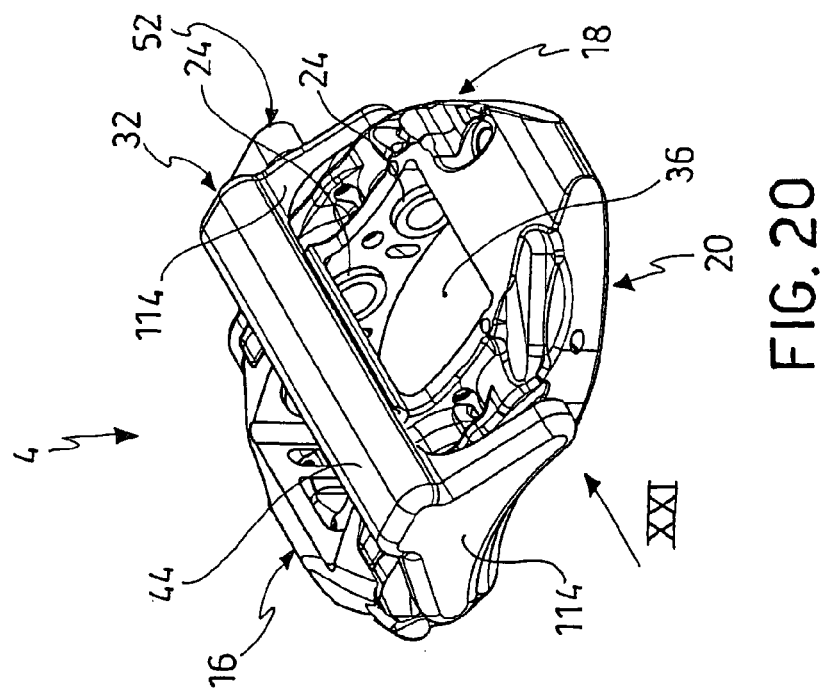
FIG.20
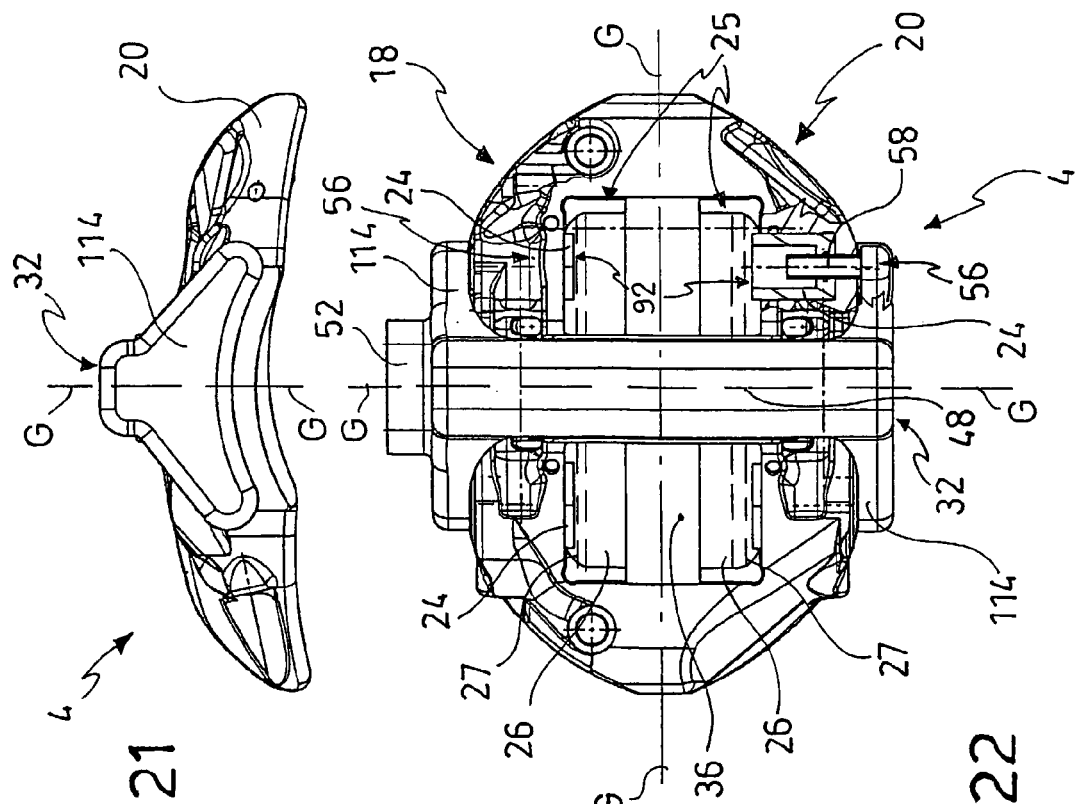
FIG.21
FIG.22

DISC BRAKE CALIPER WITH A COOLING DUCT

FIELD OF THE INVENTION

The present invention relates to a disc brake caliper, and particularly, a disc brake caliper suitable to be mounted to high performance vehicles.

BACKGROUND OF THE INVENTION

The discs of disc brakes, mainly on high performance vehicles, are known to reach a high temperature, thereby generating considerable heat flows towards the brake caliper which tends to be overheated. This overheating may be very dangerous for the brake liquid that may cause the brake to be completely ineffective, in the event it reaches the boiling temperature.

In order to overcome these drawbacks, different solutions are known from the prior art.

For example, DE 3833552 provides pads, wherein the pad plate suitable to be compressed by the caliper piston head comprises radial cavities on the side directly facing said cylinders. The piston head also comprises cavities allowing an air stream to pass through the interface area between the pistons and the pads. This air stream has the purpose of cooling the caliper body and the piston ends. On the other end, the air stream is directly generated by the rotary action of the disc, and by means of ducts carrying the air circulating about the disc towards the pistons from the caliper inner area facing the disc beside the pads housing. However, this air stream is very hot and often not only it does not ensure sufficient cooling, but can be even counter-productive.

Furthermore, JP 62-067337 and JP 61-191535 provide a cooling liquid duct in floating calipers running through the caliper piston and facing the pad plate such as to create such an air flow to lead the heat from the disc to the caliper body.

On the other hand, even the latter solution, though being satisfactory under several aspects, is very complicated to manufacture and assemble in the caliper body, and above all it is not suitable for calipers mounted on high performance vehicles being equipped with pistons provided on both disc sides.

Furthermore, EP 1016804 B1 in the name of the same applicant provides a cooling air channel formed in the thickness of a caliper central bridge; this channel fluidically communicates with the piston heads. This solution, however, tends to weaken the caliper body, which is subjected when breaking to high flexural stress being maximum just at the central bridge.

Furthermore, this channel is often overheated by the heat from the brake disc.

SUMMARY OF THE INVENTION

The problem of the present invention is to provide a disc brake caliper overcoming the drawbacks mentioned above with reference to the prior art.

These drawbacks and restrictions are resolved by a disc brake caliper in accordance with claim 1.

Other embodiments of the disc brake caliper according to the invention are as described in the subsequent claims.

BRIEF DESCRIPTION OF THE DRAWINGS

Further characteristics and the advantages of the present invention will be more apparent from the description given below of the preferred and non-limiting examples thereof, wherein:

FIG. 5 is a partially sectional view of the disc brake caliper from FIG. 2, taken along the section plane V from FIG. 2;

FIGS. 6A and 6B are perspective views of a detail of the disc brake caliper from FIG. 2;

FIG. 20 is a perspective view of a disc brake caliper according to a further embodiment of the present invention;

FIG. 21 is a side view of the disc brake caliper from FIG. 20, on the side of arrow XXI from FIG. 20;

FIG. 22 is a partially sectional plan view of the caliper from FIG. 20;

DETAILED DESCRIPTION OF THE INVENTION

The elements or parts of elements in common between the embodiments described below will be designated with the same numerals.

By "radial direction" is meant a direction substantially perpendicular to the X rotation axis of the disc brake associable to the disc brake caliper.

By "axial direction" is meant a direction substantially parallel to the X rotation axis of the brake disc.

By "tangential direction" is meant a direction substantially perpendicular to the axial direction and the radial direction, as well as parallel to the braking band of the associable brake caliper.

With reference to said figures, with 4 there has been generally indicated a disc brake caliper, suitable to be mounted astride a brake disc 8 pivoting about its rotation axis X.

Figure 1:
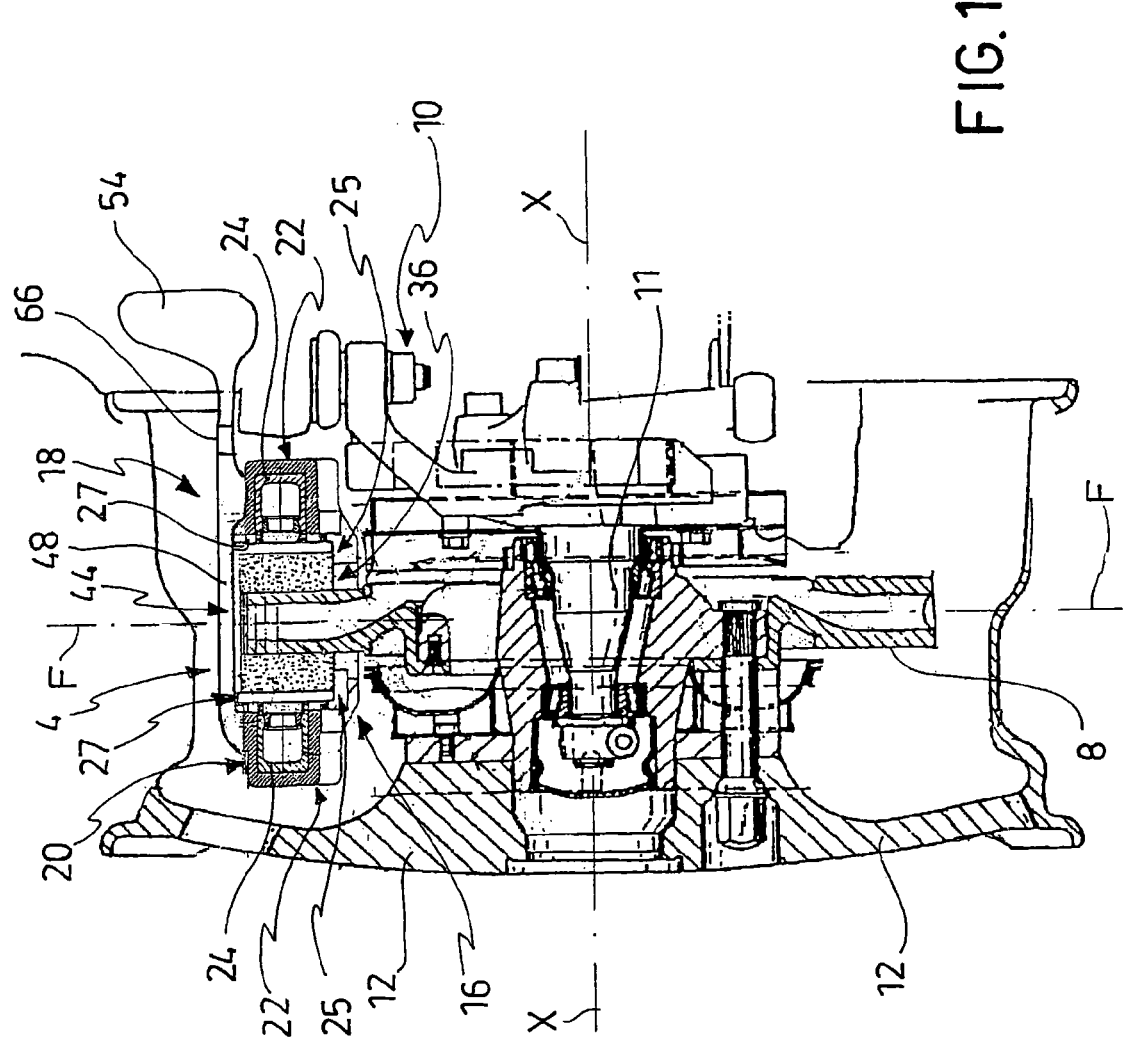
FIG. 1 is a schematic view, partially in section, of a disc brake caliper according to the present invention, being mounted on a corresponding suspension, a vehicle wheel being associated thereto.
Figure 2:
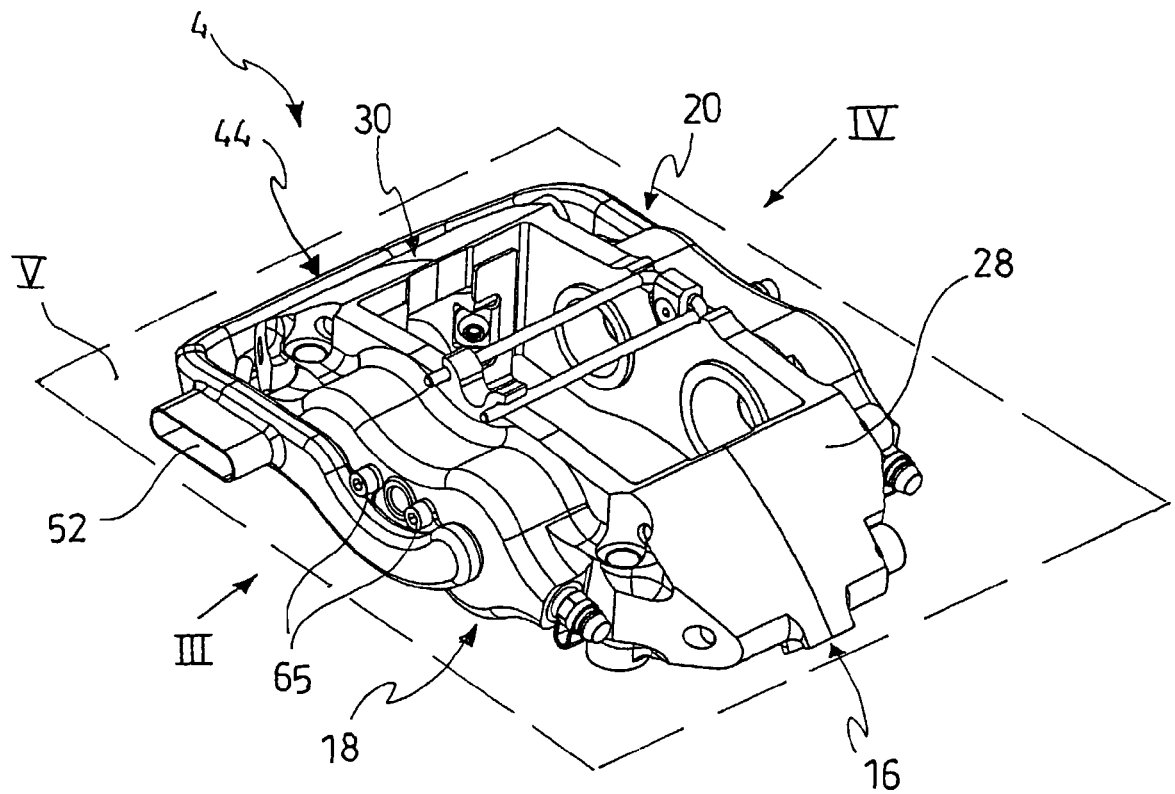
FIG. 2 is a perspective view of a disc brake caliper according to the present invention.
Figure 3:
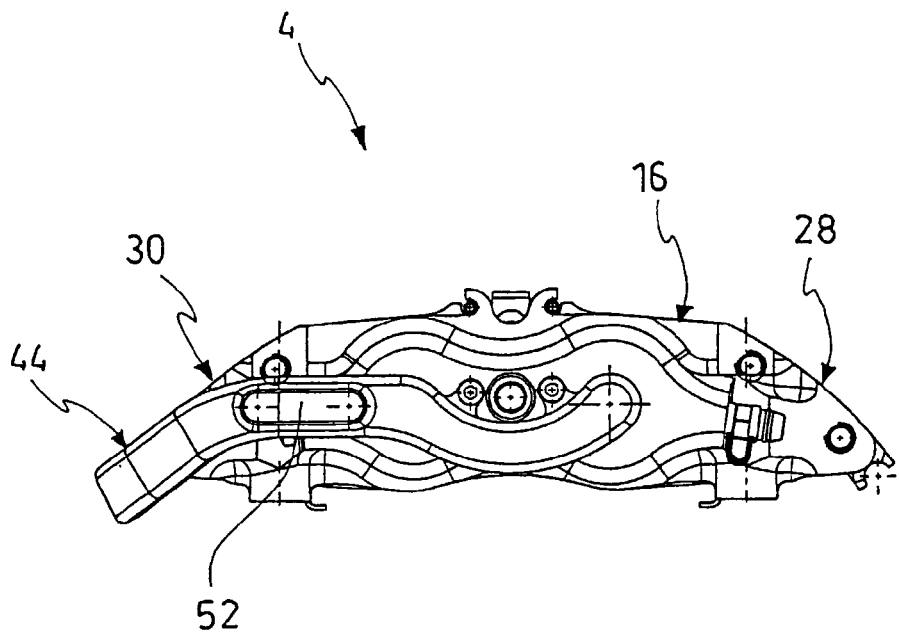
FIG. 3 is a side view of the disc brake caliper from FIG. 2, taken on the side of arrow III from FIG. 2.
Figure 4:
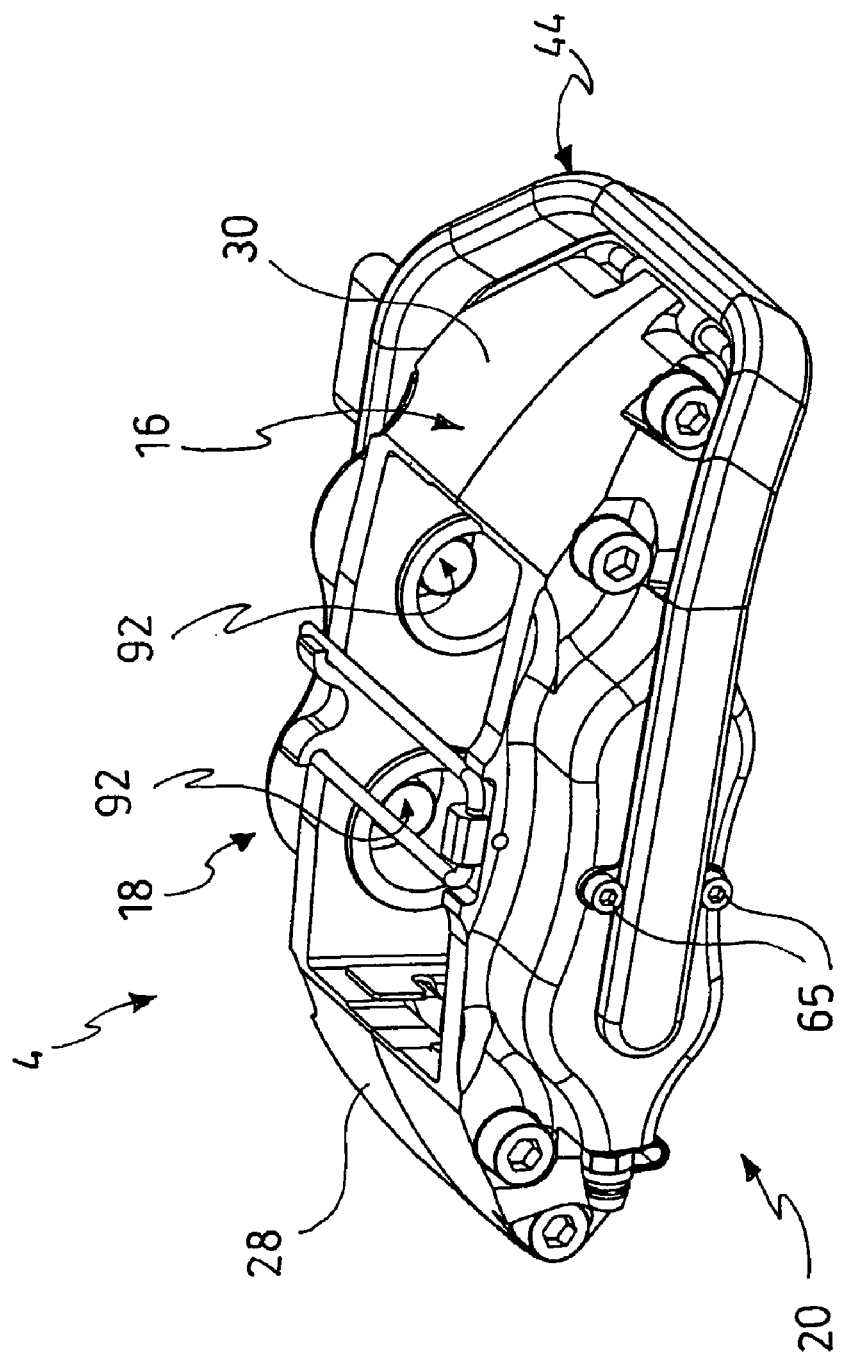
FIG. 4 is a perspective view of the disc brake caliper from FIG. 2, taken from the side of arrow IV from FIG. 2.
Figure 7A:
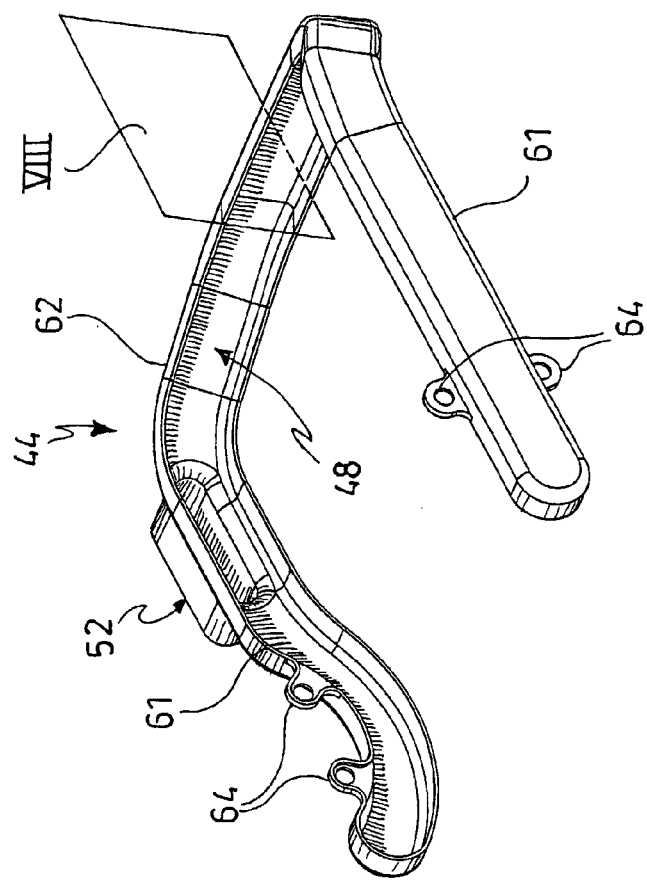
FIGS. 7A and 7B are perspective views of a detail of the disc brake caliper from FIG. 2, according to a further embodiment.
Figure 7B:
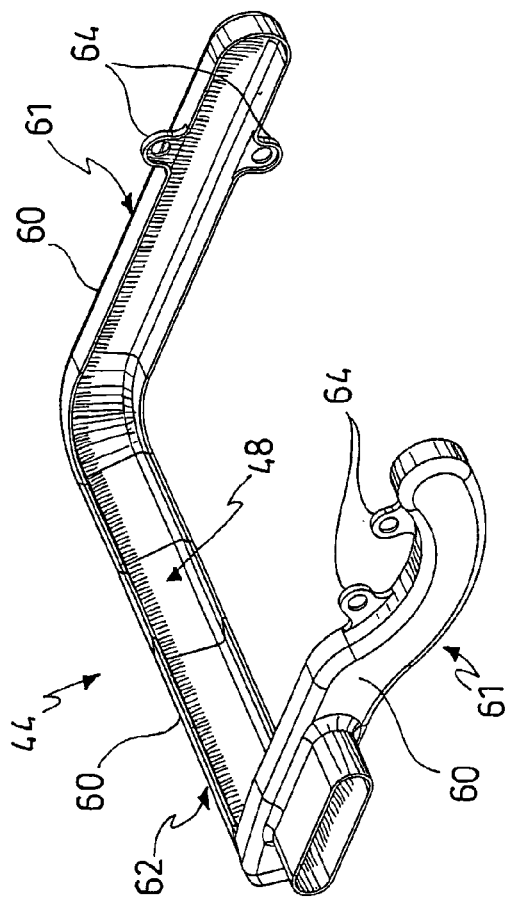
Figure 8:
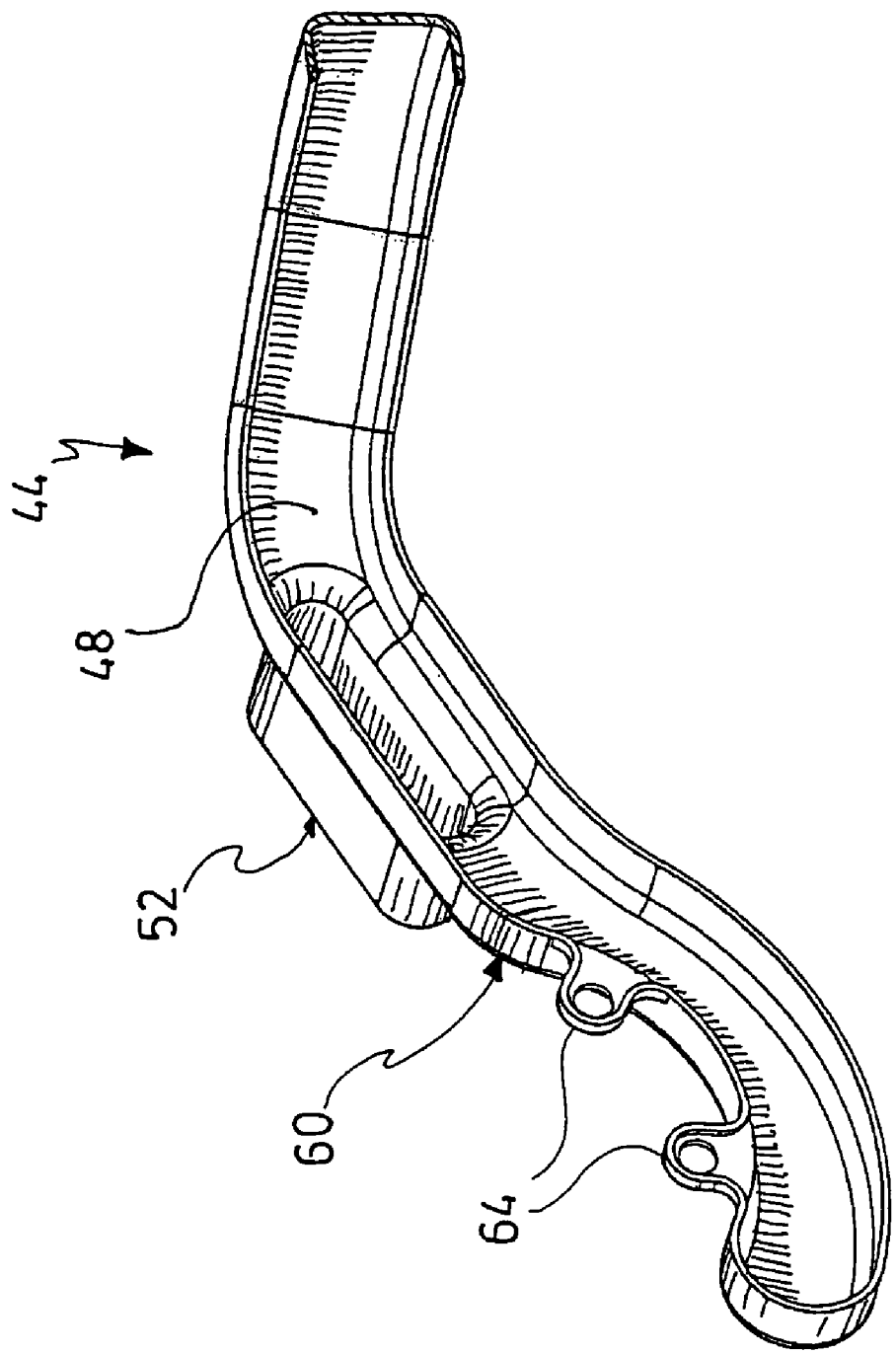
FIG. 8 is a sectional view of the detail from FIG. 7B taken along the section plane VIII from FIG. 7B.
Figure 9A:
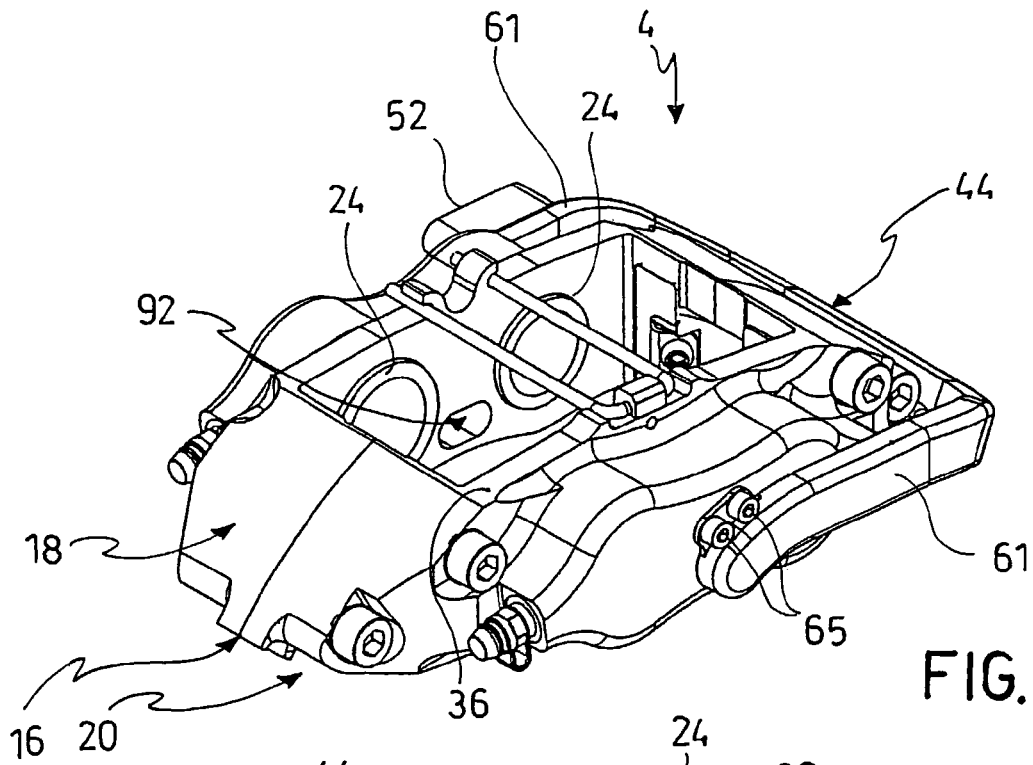
FIGS. 9A-9B are two perspective views of a disc brake caliper according to a further embodiment of the present invention.
Figure 9B:
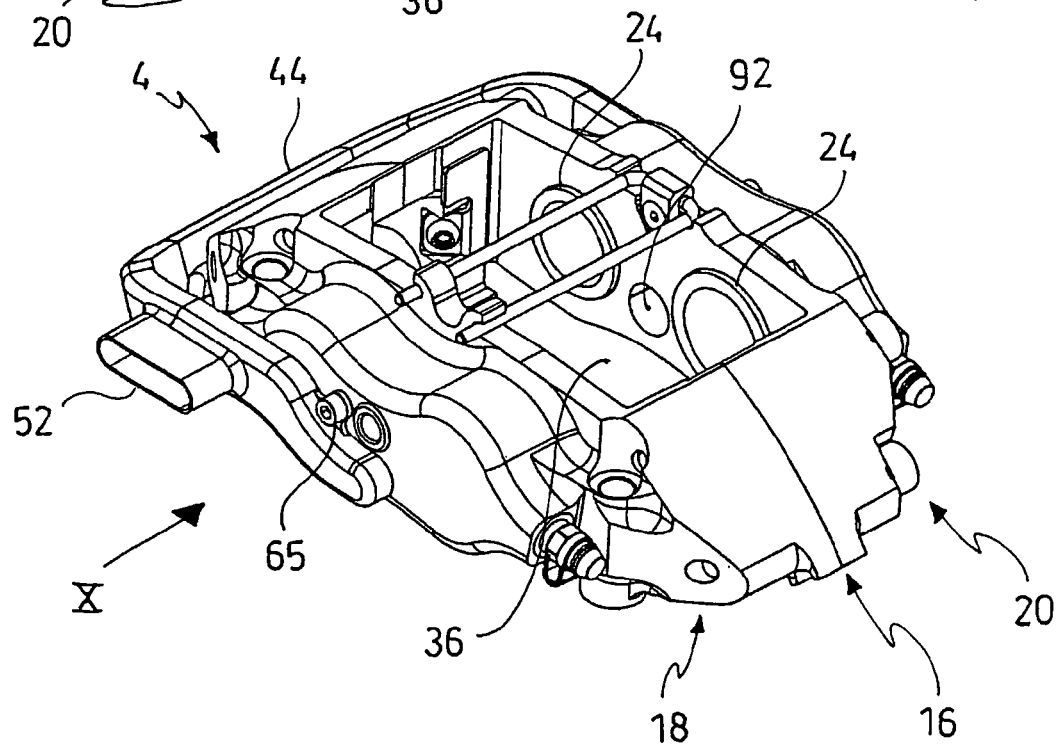
Figure 10:
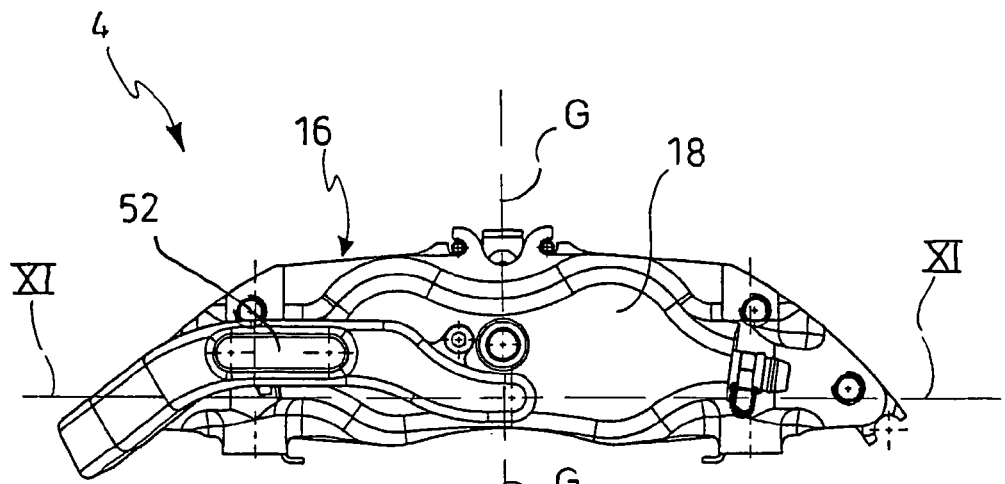
FIG. 10 is a side view of the caliper from FIG. 9B taken on the side of arrow X from FIG. 9B.
Figure 11:
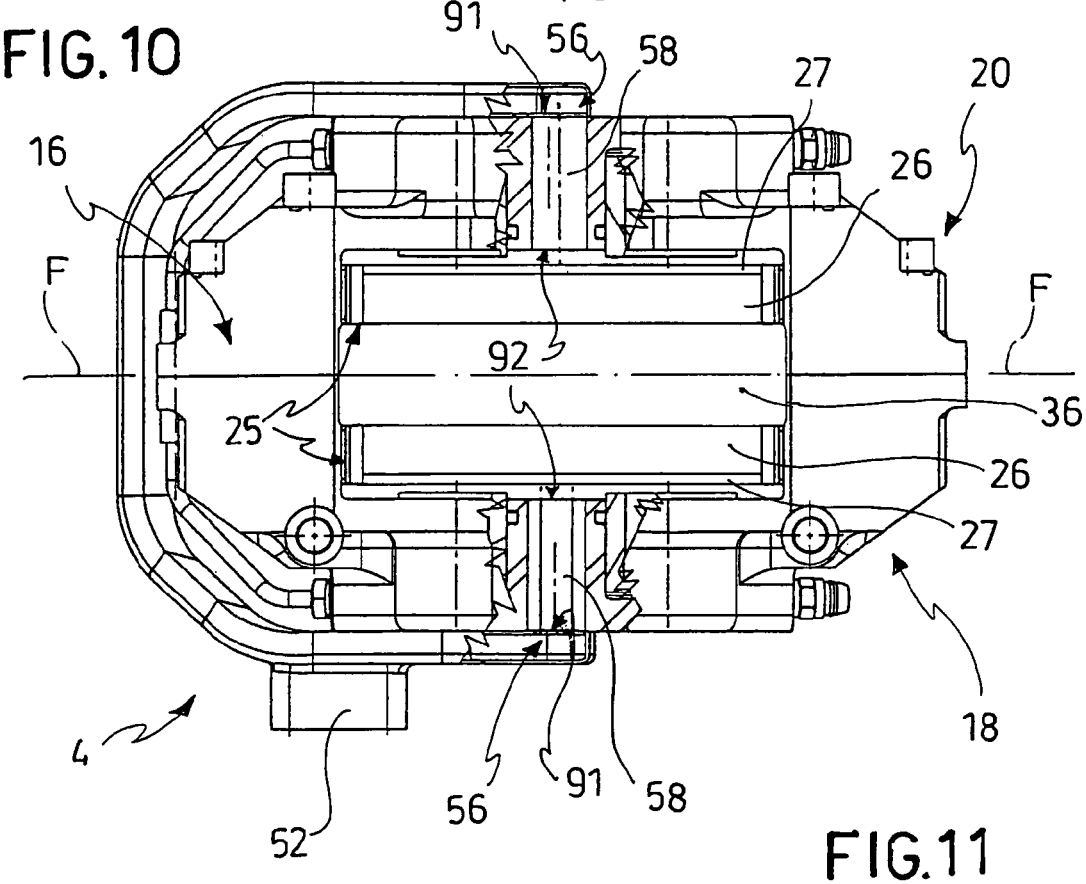
FIG. 11 is a partially sectional view of the caliper from FIG. 10 taken along the plane XI from FIG. 10.
Figure 12:
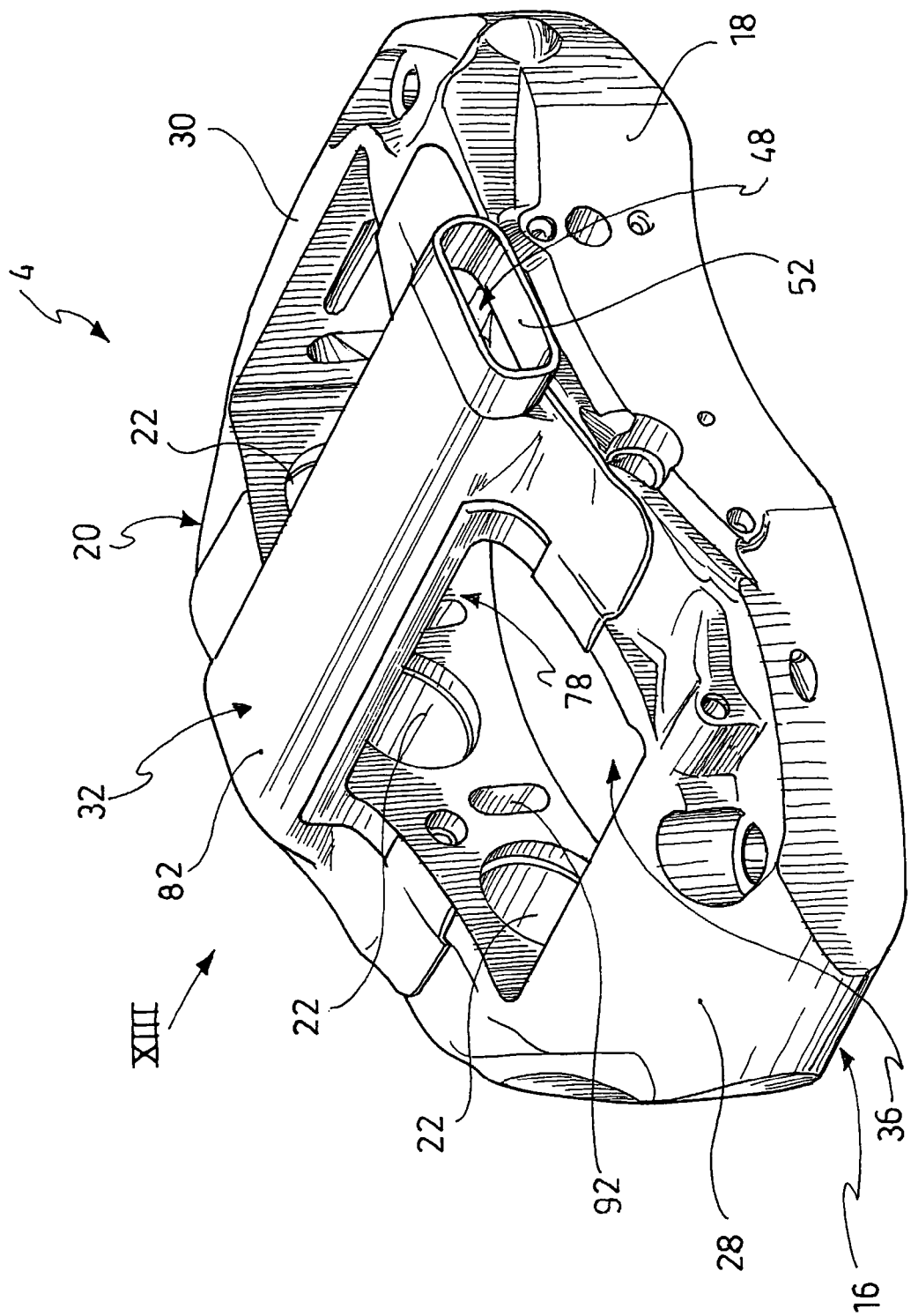
FIG. 12 is a perspective view of a disc brake caliper according to a further embodiment of the present invention.
Figure 13:
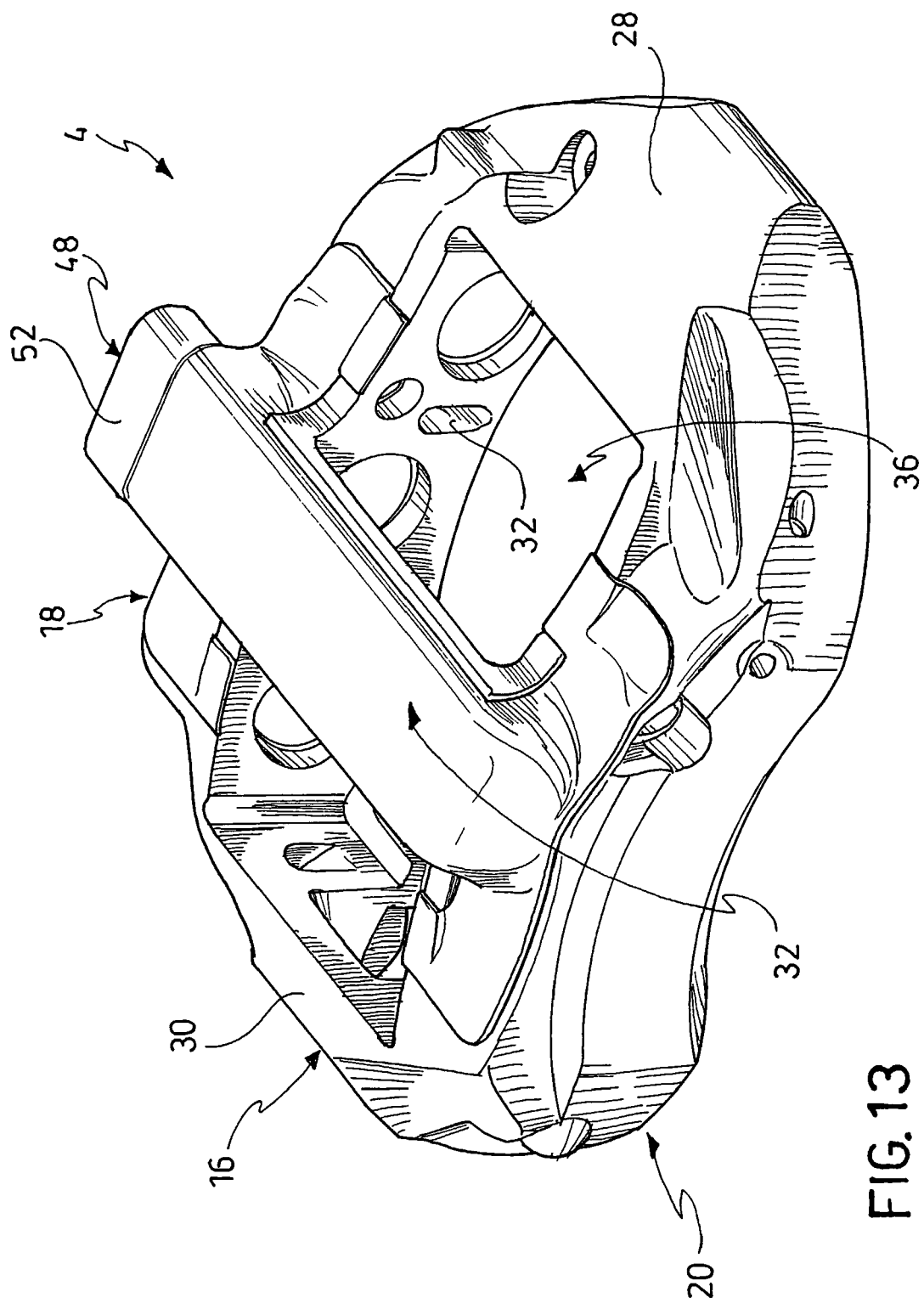
FIG. 13 is a perspective view of the disc brake caliper from FIG. 12 taken on the side of arrow XIII from FIG. 12.
Figure 14:
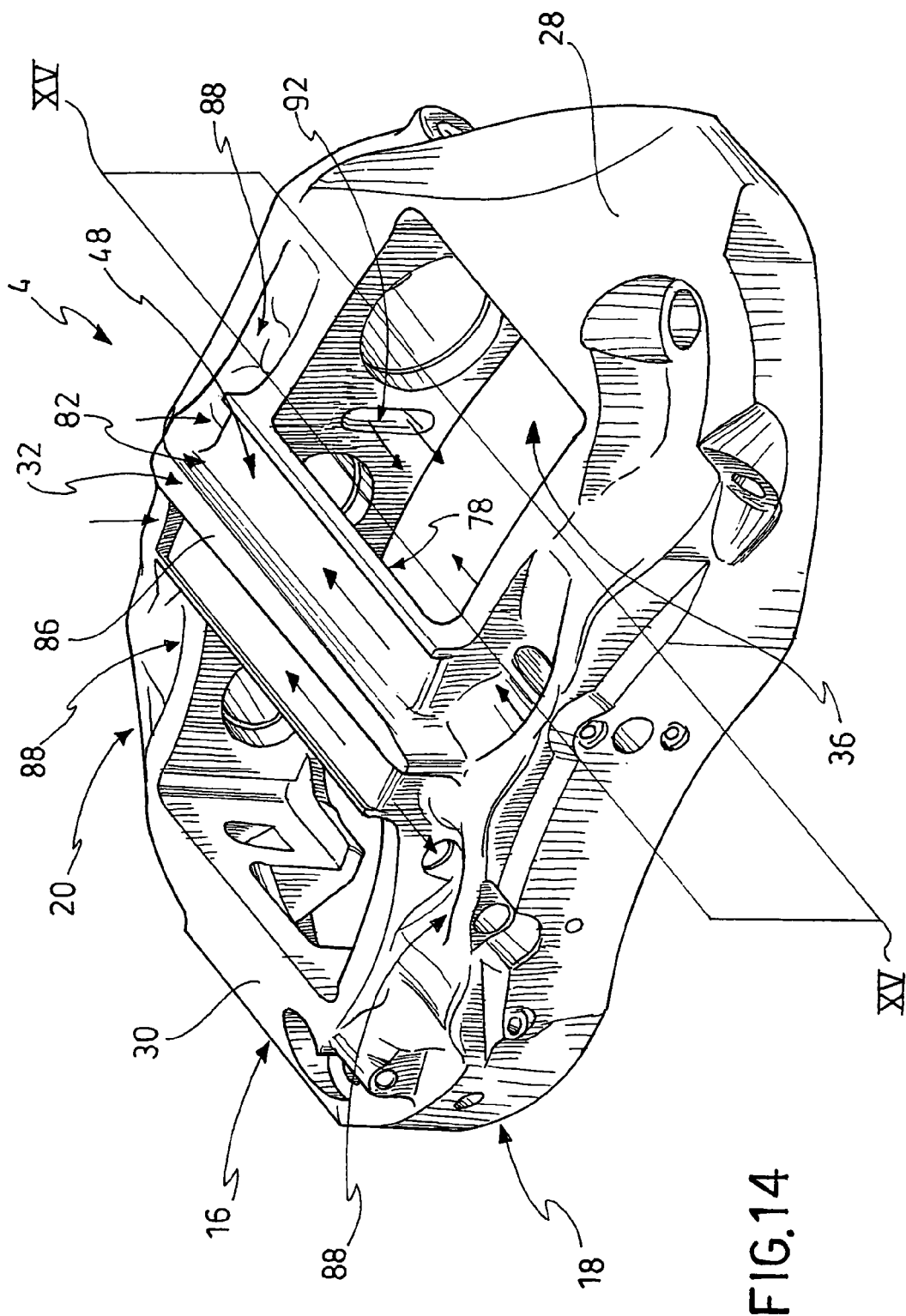
FIG. 14 is a perspective view of the caliper body of the caliper from FIG. 12.

Said caliper 4 is suitable to be supported by a suspension 10 comprising a hub 11, a wheel 12 being associable thereto, such that the caliper is comprised between the suspension 10 and the wheel 12, such as in the example illustrated in FIG. 1, relative to an axial direction.

The disc brake caliper 4 comprises a caliper body 16 provided with a suspension side portion 18 and a wheel side portion 20.

The suspension side portion 18, relative to X axis, faces said suspension 10 to support the caliper. The wheel side portion 20, relative to X axis, faces the wheel 12.

Both the wheel side portion 20 and the suspension side portion 18 comprise cylinders 22 being suitable to house pistons 24 facing pads 25 for braking the brake disc 8. The pads 25 comprise a friction portion 26 suitable to carry out a frictional action against the facing brake disc and a thrust portion 27 suitable to be affected by the facing pistons 24.

The suspension side 18 and wheel side 20 portions are connected to each other by at least one connecting bridge, particularly a couple of side connecting bridges 28,30 extending astride the brake disc 8, thereby tangentially defining the caliper body.

The caliper body 16 can also comprise at least one central connecting bridge 32, being suitable to connect the suspension side and wheel side portions of the caliper body 16, said at least one central connecting bridge being comprised, relative to a tangential direction, between the side connecting bridges 28,30.

The suspension side and wheel side portions and the side and central connecting bridges define a housing recess 36 (FIG. 5) for a brake disc portion, said housing recess 36 being substantially simmetrical relative to a midplane F of the associable brake disc, perpendicular to X axis (FIG. 1).

According to an embodiment, the cylinders 22 of the wheel side 20 and suspension side 18 portions are fluidically interconnected by a brake liquid pipe 40 and suitable inner canalizations such as of the known type, said pipe 40 being suitable to deliver the brake liquid to respective cylinders and pistons being housed therein, in order to apply a thrust action on the pads.

According to an embodiment, the brake liquid pipe has an overall U-shape, and is astride the brake disc, such as to follow the profile of one of side connecting bridges 28,30.

Advantageously, the caliper 4 comprises at least one casing 44 being associable to a surface of the caliper body opposite the housing recess 36 of the disc, such as to define a duct 48 extending between said suspension side 18 and wheel side 20 portions.

By "caliper body surface opposite the housing recess 36" is meant any caliper body surface not facing said housing recess 36, i.e. facing away from the associable brake disc 8 and the housing recess 36.

The duct 48 comprises at least one inlet 52, being advantageously arranged at the suspension side portion 18, such as to receive a cooling air stream, such as from an air intake 54 provided on the vehicle (FIG. 1). Said duct 48 is connected to cooling means 56 of said suspension side 18 and wheel side 20 portions, which are suitable to convey the air stream near the thrust portions 27 of pads 25, said thrust portions 27 being affected by the corresponding pistons 24.

Particularly, said cooling means 56 comprise ventilation ducts 58 running through said suspension side 18 and wheel side 20 portions, and lead to the housing recess 36, such as to direct the air stream towards the thrust portions 27 of pads 25.

According to an embodiment of the present invention, said casing 44 comprises a closed duct 48, i.e. a pipe having a continuous side surface such as to create a substantially airtight passage.

According to a further embodiment, said casing 44 comprises a side wall 60 defining the duct 48, which is at least partially open at a casing portion 44 being suitable to interface with the side surface of the caliper body 16, which defines an air duct 48 together with the casing 44; in other words, at least one wall of said duct 48 is provided by a caliper body 16 side wall opposite said housing recess 36.

Said casing can be associated to at least one side connecting bridge 28,30 of caliper 4.

Advantageously, the casing 44 is associated to the caliper side connecting bridge arranged at the brake liquid pipe 40, which is suitable to fluidically connect the cylinders 22 of the suspension side portion 18 to the cylinders 22 of the wheel side portion 20 to each another; advantageously, said casing 44 at least partially covers said brake liquid pipe 40. In other words, the casing 44 can be, for example, arranged opposite the brake liquid pipe 40, such that the latter is comprised between the casing 44 and the caliper body 16, or rather the casing 44 can at least partially enclose the brake liquid pipe 40, such as to provide a covering for the pipe.

In both solutions, the brake liquid pipe 40 is advantageously protected from any accidental shocks or objects being raised by the wheel or due to mounting/dismounting operations of the wheel.

According to an embodiment, the casing has an overall U-shape, having a couple of branches 61 parallel to each other and suitable to face side surfaces of the suspension side and wheel side portions and a crosspiece 62 being perpendicular to said branches 61 and suitable to face at least one of said side connecting bridges 28,30.

At these branches 61, the casing 44 comprises boards 64 provided with holes for screws or pins 65 to pass therethrough to clamp the casing 44 to the caliper body 16.

The casing 44, at said crosspiece 62, can comprise further boards for clamping the same; furthermore, the caliper body 16, at the corresponding side connecting bridge 28,30, can comprise at least one appendix 63 suitable to provide a rest and further support for the crosspiece. Said appendix 63 can also be used as a support for the brake liquid pipe 40.

Preferably, the branches 61 and the crosspiece 62 are substantially counter-shaped to the outer surface of caliper body 16 which they directly face, such as to follow the profile thereof and reduce the overall size of the caliper body 16, relative to a tangential and axial direction.

Advantageously, at one of said branches 61, particularly the branch being arranged, in an assembly configuration, at the suspension side portion 18, the casing 44 comprises said inlet 52, having for example a slot section. Said inlet 52 extends for example perpendicularly to the corresponding branch, i.e. axially towards suspension 10.

The inlet 52 can be advantageously connected to a union 66 to receive a cooling air stream. This stream can be obtained either in a "forced" manner, i.e. by means of ventilation means conveying the air inside the union, or by means of air intakes being suitably arranged, for example, in front of the vehicle such as to take the air directly from outside the vehicle while it is moving (FIG. 1).

The inlet 52 can have any section and the corresponding union can be connected to the inlet for example by applying a pressure, through connecting clamps and the like. Preferably, said connection is of the removable type to enable the dismounting of the caliper body and casing.

Advantageously, said duct comprises, at each branch 61, at least one outlet 70, suitable to convey the cooling liquid flow at said thrust portions 27 of pads 25. Particularly, said outlets 70 can be arranged such as to face the suspension side 18 and wheel side 20 portions at the relative cylinders 22, for example such that said outlets 70 are coaxial relative to said cylinders 22.

According to an embodiment, the suspension side 18 and wheel side 20 portions comprise, for example, coaxially to the corresponding cylinders 22, the ventilation ducts 58 passing through the pistons 24 such as to directly lead to the pads 25 and particularly the thrust portions 27 of the pads 25.

According to a further embodiment, said ventilation ducts 58 are located, in the respective suspension side 18 and wheel side 20 portions, between two adjacent cylinders 22, such as to lead to the housing recess 36 and face the thrust portions 27 of the pads 25.

Preferably, said ventilation ducts 58 lead to the housing recess 36 such as to be arranged towards the inside, i.e. towards the rotation axis X, as much as possible. In other words, said channels 58 are placed beside the lower portions of cylinders 22 and pistons 24, i.e. the piston portions radially facing the rotation axis X. In accordance with an embodiment, said channels 58 separate cylinders 22 being placed beside to each other.

According to an embodiment, the passage section of the duct 48 is constant, along said duct 48. According to a further embodiment, said passage section of the duct 48 is variable along the extension of said duct, such as to share the amount of air being delivered to the outlets of the relative suspension side 18 and wheel side 20 portions or along each of said sides in a preset manner.

Preferably, in a caliper embodiment comprising at least two ventilation ducts 58 per wheel side and suspension side portions, the outlet section of the duct being tangentially arranged towards the disc leading portion is smaller than the outlet section of the duct being tangentially arranged towards the disc trailing portion.

In other words, on each portion of the caliper body, the channels 58 being arranged towards the disc leading portion have a smaller outlet section than the outlet section of those channels being arranged towards the disc trailing portion; by "disc leading portion" is meant that disc portion first entering the housing recess 36 while the disc is rotating, whereas by "disc trailing portion" is meant that disc portion first exiting said housing recess 36 during this rotation.

Said duct 48 may provide suitable bulkheads internally dividing the duct into several channels for the stream to be divided and conveyed at several outlets.

According to a further embodiment, said casing 44 is associated to a central connecting bridge 32 of the caliper body 16, being comprised between said side connecting bridges 28,30, relative to a tangential direction.

Said central connecting bridge 32 extends astride the brake disc 8 for example at a second midplane G of the housing recess 36, relative to a tangential direction.

This central connecting bridge 32 comprises a lower wall 78, radially facing the associable brake disc and pads 25, and an upper wall 82, radially opposite the brake disc and the lower wall 78.

Preferably, to said upper wall 82 there is associated a partition wall 86, substantially parallel to the axial direction, such as to symmetrically divide the upper wall.

Advantageously, the suspension side and wheel side portions comprise, at parts tangentially opposite relative to the partition wall 86, pockets 88, i.e. cavities radially extending towards the rotation axis X of the brake disc 8. At said pockets 88 there are advantageously located said ventilation ducts 58 passing through the suspension side 18 and wheel side 20 portions from an inlet hole 91 to an outlet hole 92. The inlet hole 91 is for example located near said pockets.

The outlet hole 92 is advantageously located on a vertical wall of each of wheel side 20 and suspension side 18 portions, each vertical wall being substantially parallel to the associable brake disc and axially defining the housing recess 36.

According to an embodiment, each cooling channel 58 has a substantially radial inlet hole 91 and a substantially axial outlet hole 92. By "axial or radial outlet hole" is meant that a symmetry axis of the hole section is arranged according to a radial or axial direction, such that the ingoing or outgoing stream is substantially directed according to said radial or axial direction.

Figure 15:
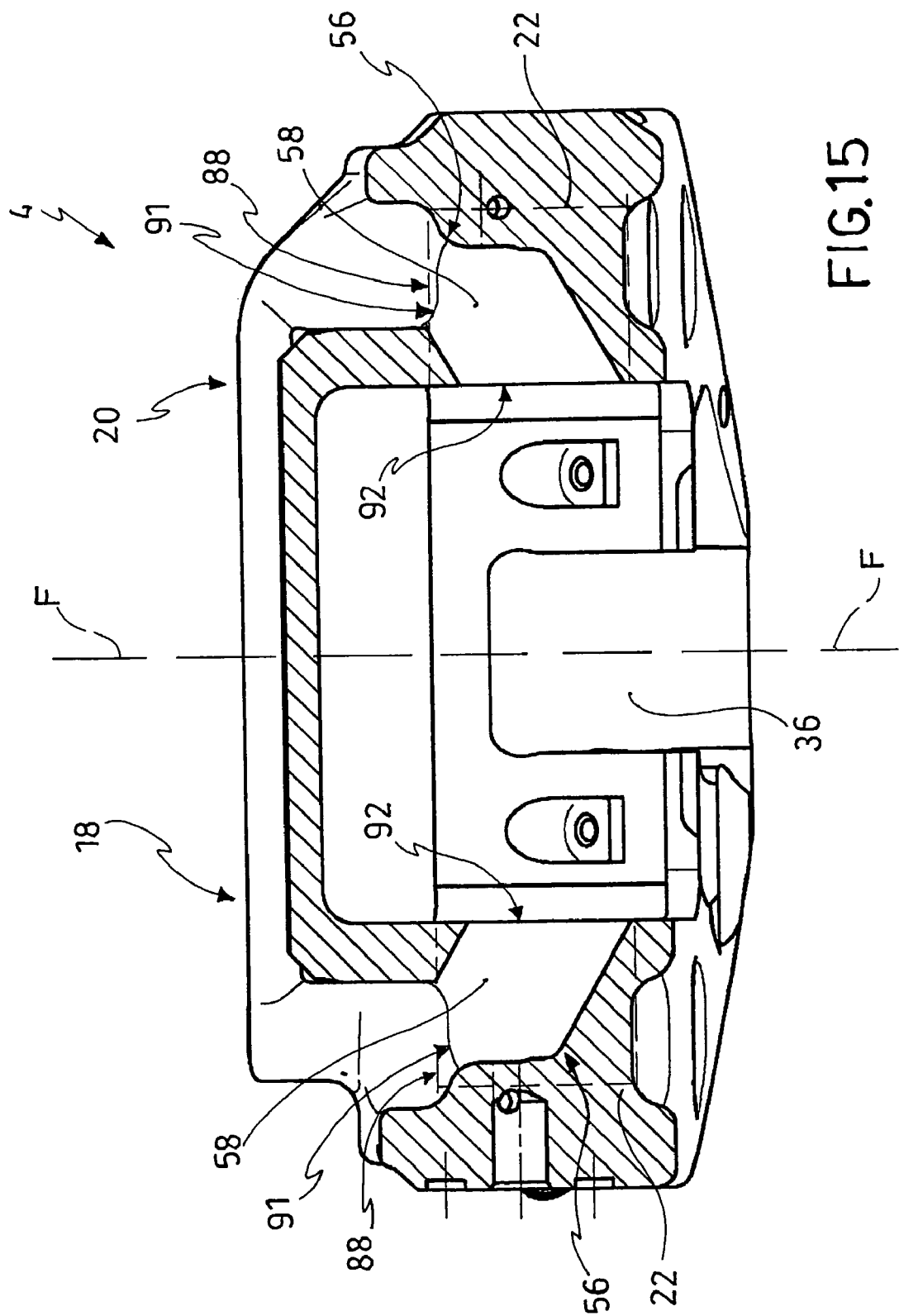
FIG. 15 is a sectional view of the caliper body from FIG. 14 taken along the sectional plane XV from FIG. 14.
Figure 16:
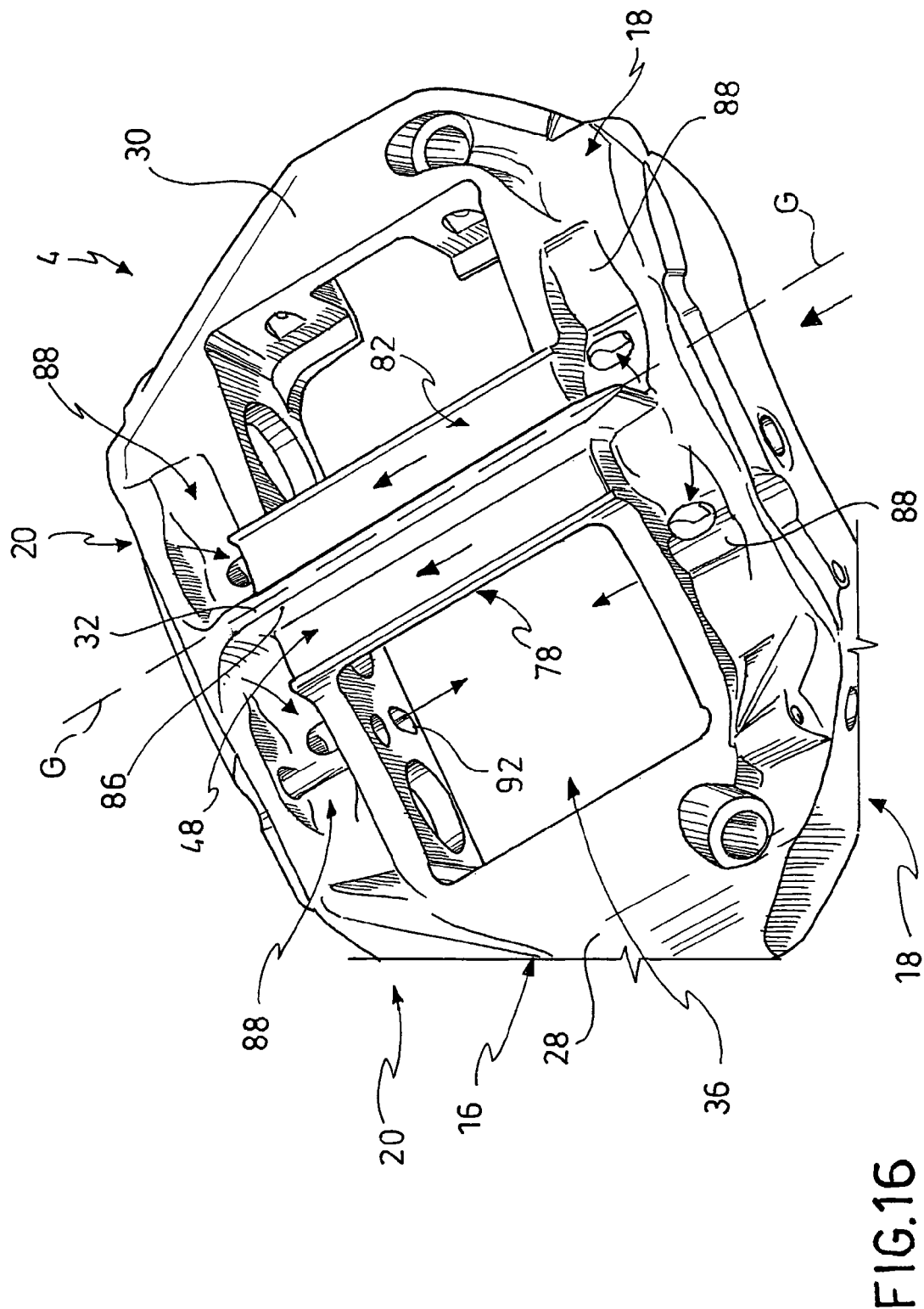
FIG. 16 is a further perspective view of the caliper body from FIG. 14.
Figure 17:
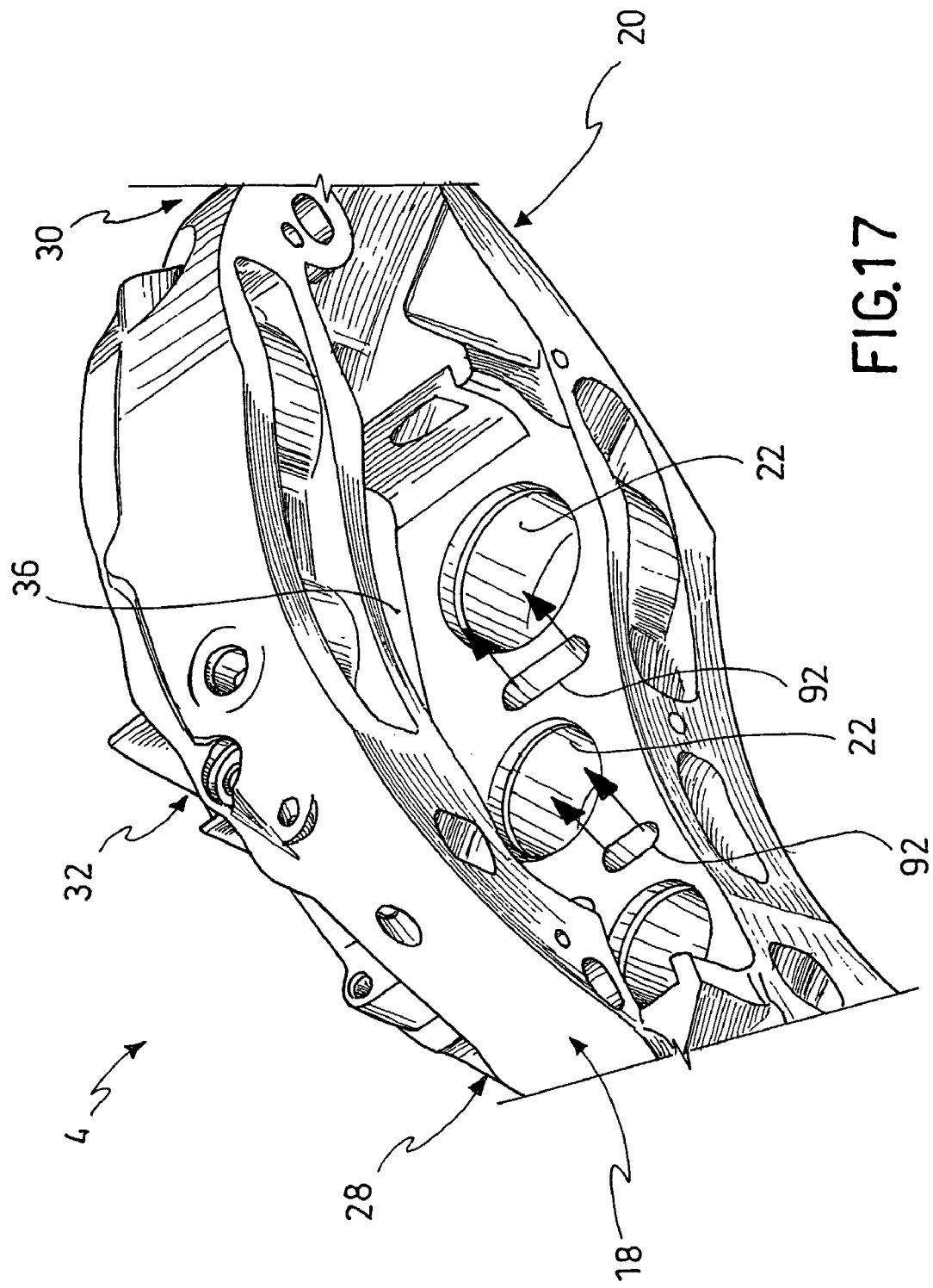
FIG. 17 is a further perspective view of a detail of the caliper body from FIG. 14.
Figure 18:
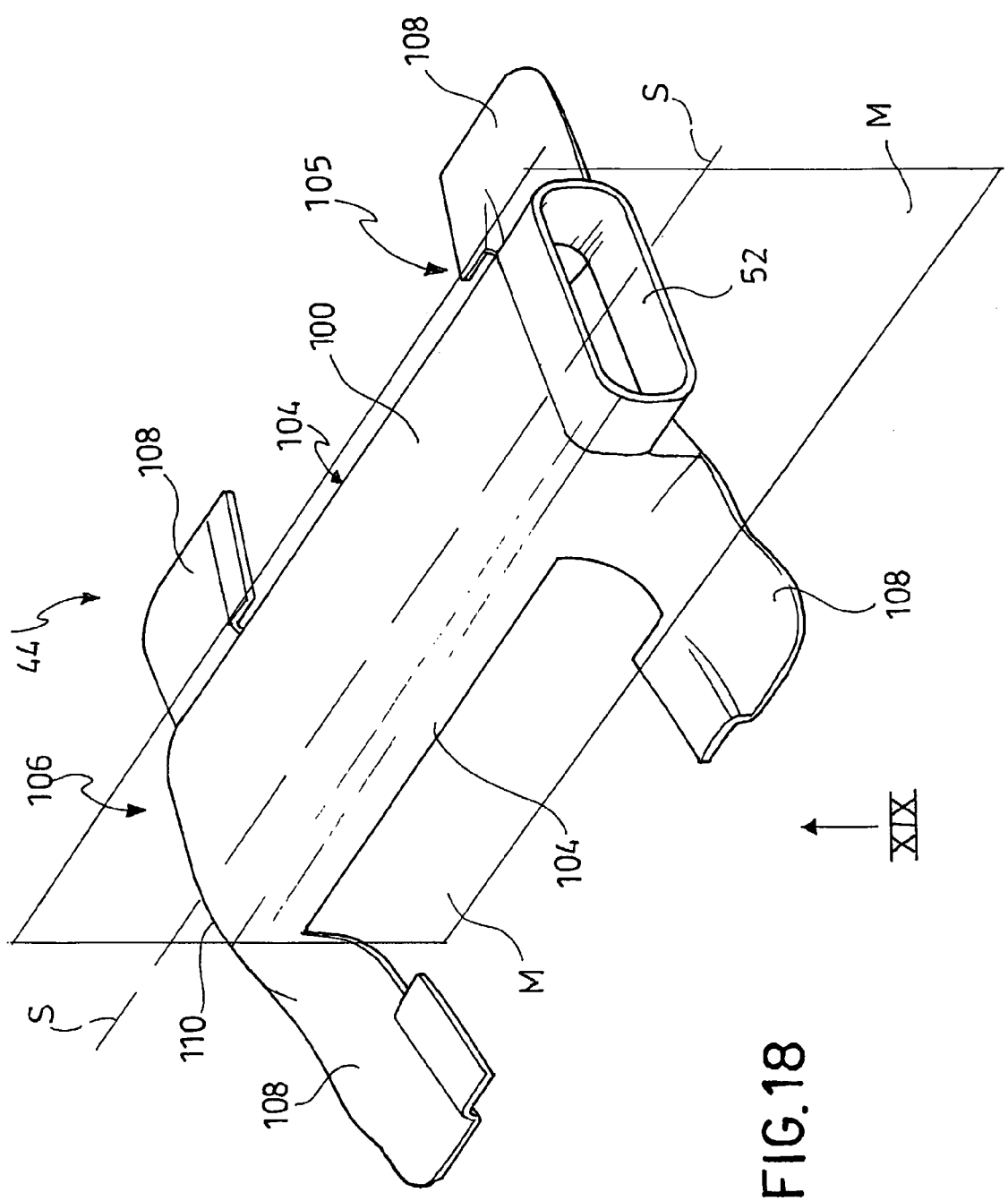
FIG. 18 is a perspective view of a detail of the caliper from FIG. 14.
Figure 19:
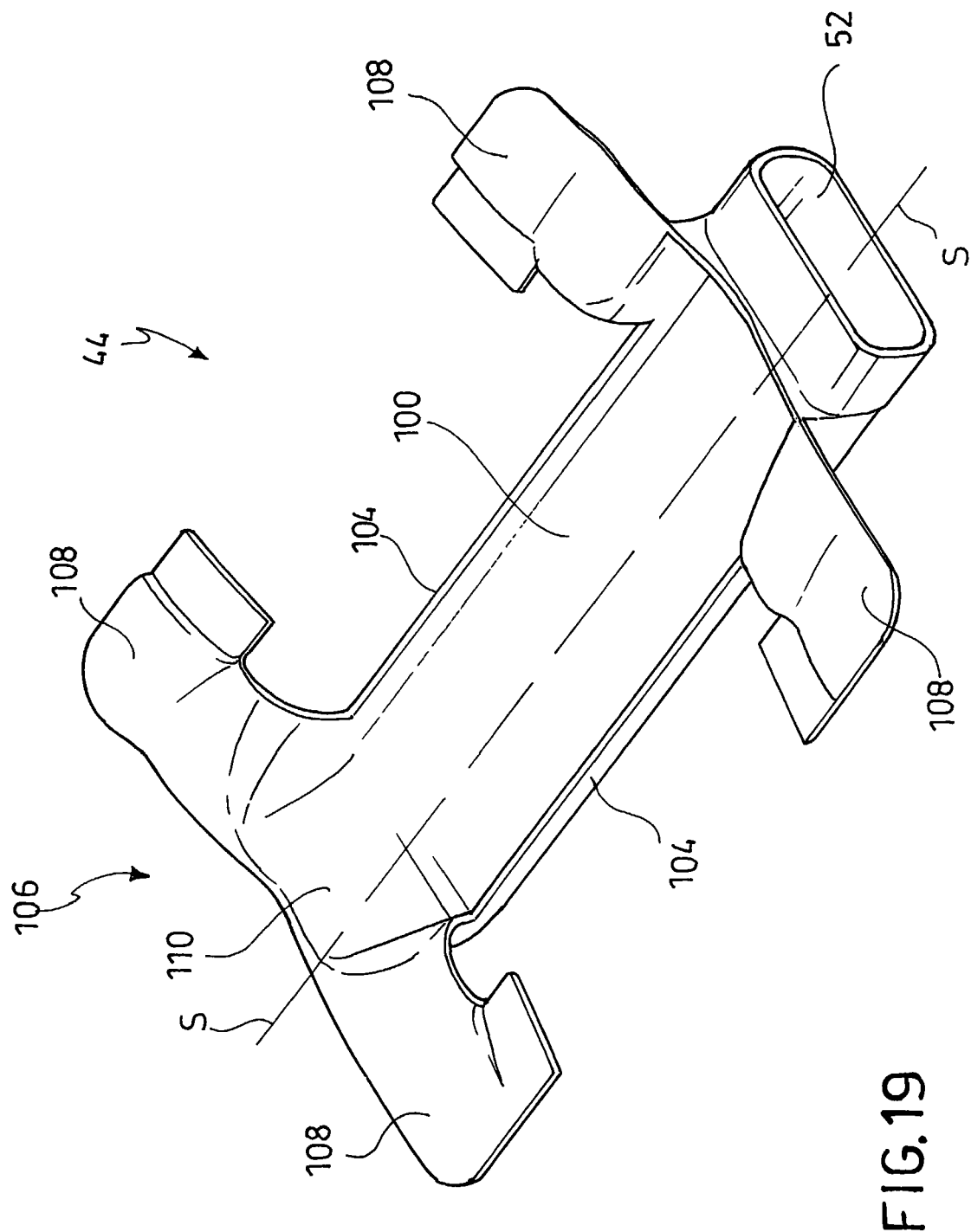
FIG. 19 is a perspective view of the detail from FIG. 18 taken on the side of arrow XIX from FIG. 18.

According to a further embodiment, such as illustrated in FIG. 15, at least one ventilation channel 58 comprises an outlet, for example slotted, hole 92, having a greater, for example circular, section than the inlet hole 91, such that the outgoing cooling stream will diverge, thereby being distributed against the thrust portion 27 of the pads 25. In other words, the ventilation channel 58, at the outlet hole 92, is diverging towards the pad 25, such as to facilitate the delivery of the outgoing cooling stream against the thrust portion 27 of the pad 25.

According to an embodiment, said outlet hole 92 is advantageously located between two consecutive cylinders 22 being arranged on the same portion 18,20 of the caliper body 16.

Preferably, the outlet hole 92 is radially located towards the inside, i.e. towards the rotation axis X of the associable brake disc. In other words, said ventilation ducts 58 are placed beside the lower portions of pistons 24, i.e. the piston portions radially facing the rotation axis X.

Each duct can have a constant section, but also a variable section, where the section is intended as being measured relative to a plane perpendicular to the extension direction of the duct.

For example, the duct can be provided with a circular inlet hole 91 and shaped until reaching a slotted outlet hole 92 having a greater section than the inlet hole 91, such that the outlet cooling stream will diverge, thereby expanding against the thrust portion 27 of the pads 25 facing the pistons 24.

Advantageously, to said central connecting bridge 32 a casing 44 can be associated, such as to form together with the caliper body 16 a feeding duct 48 of the cooling liquid to the caliper body 16.

Said casing 44 comprises for example a central body 100, having a substantially rectangular shape with main extension S, being provided with folded edges 104, along the sides parallel to said main extension S, said folded edges being for example perpendicular to the central body 100. The central body 100 extends between a suspension side end 105 and a wheel side end 106.

Near said suspension side 105 and wheel side 106 ends of the central body 100, being opposite relative to the main direction S, the casing 44 comprises two couples of tabs 108, substantially perpendicular to the central body 100 and arranged substantially symmetrical to the main extension S; the casing 44 is overall symmetrical relative to a symmetry plane M, passing through said main extension S such that, in an assembly configuration of casing 44 to the central bridge 32, said symmetry plane M overlaps the second midplane G of the housing recess 36.

At the wheel side end 106, the casing 44 comprises a lid 110, whereas at the suspension side end 105, the casing 44 comprises the inlet 52 having for example a quadrangular section.

In an assembly configuration of the casing 44 to the caliper body 16, the central body 100 overlaps the upper wall 82 of the central connecting bridge 32, thereby forming together with the partition wall 86 two axial ducts 48 being parallel to each other; furthermore, the tabs 108 are each arranged to cover one pocket 88 of the side portions 18,20 of the caliper body 16 by conveying a liquid flow from each suspension side 105 and wheel side 106 ends to the respective inlet holes 91. Finally, said inlet 52 is axially arranged on the side of the associable suspension 10, such as to be connected, as stated above, to suitable air intakes 54.

The inlet 52 can be advantageously connected to the union 66 to receive the cooling air stream. This stream can be obtained in a "forced" manner, i.e. through ventilation means conveying the air within the union, or through air intakes suitably arranged, for example, in the front of the vehicle such as to take the air directly from outside the vehicle while it is moving (FIG. 1).

According to a further embodiment, such as for example illustrated in the FIGS. 20,21,22, the casing 44 axially extends over a greater portion than the axial width of the caliper body, such that, at the suspension side 18 and wheel side 20 ends, comprises, either as one piece or in separate parts, two jambs 114, being suitable to follow the profile of the suspension side 18 and wheel side 20 portions relative to an axial direction.

Particularly, said jambs 114 face inlet hole 91 arranged at cylinders 22, on the side opposite the housing recess 36 and being such as to pass through the cylinders 22 such as to lead to outlet holes 92 being arranged at the thrust portions 27 of the pads 25.

In other words, the inlet holes 91 and the outlet holes 92 intercept axial ventilation ducts 58, being preferably arranged coaxially to the relative cylinders 22.

Figure 23:
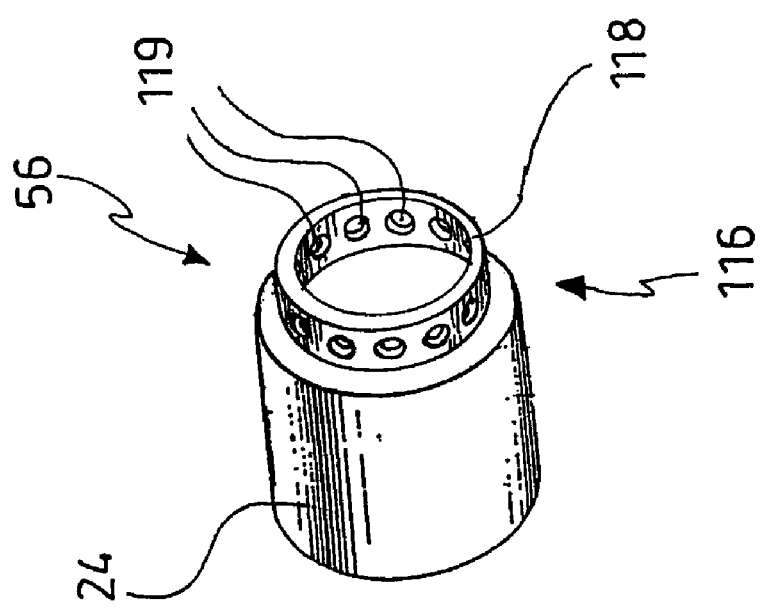

According to a further embodiment, the cooling means 56 comprise diffusing elements 116 being arranged at the piston 24 head, i.e. the portion of a piston 24 directly pushing the thrust portion 27 of the pads 25. Said diffusing elements 116 comprise collars 118 provided with holes 119 being for example arranged radially to the circular head of pistons 24, such as illustrated for example in FIG. 23, such as to facilitate the delivery of the cooling air stream to the thrust portion 27 of the pads 25.

Figure 24:
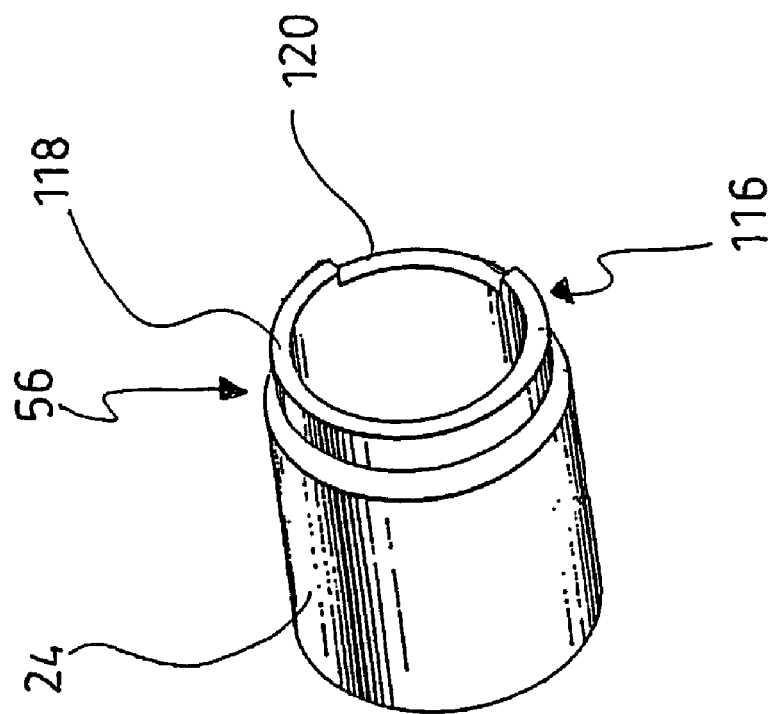
FIGS. 23 and 24 are perspective views of details of the disc brake caliper from FIG. 1, according to further embodiments of the present invention.

According to a further embodiment, for example illustrated in FIG. 24, said collars 118 comprising at least one axial notch 120, i.e. directed parallel to the piston thrust direction. Said diffusing elements 116 can be advantageously provided on all the embodiments described, such as to improve the delivery of the cooling stream at the thrust portion 27 of the pads 25.

The operation of the disc brake caliper according to the invention will be now described.

Particularly, the caliper 4 is mounted on the relative support, astride the brake disc 8, such that the suspension side portion 18 axially faces the suspension 10 and the wheel side portion 20 axially faces the wheel 12. Thereby, the duct inlet 52 is also arranged on the side of the associable suspension 10.

Advantageously, this inlet is fluidically connected to an air intake being for example arranged at the front of the vehicle, such as to take the air stream when the vehicle is moving. Systems of forced air ducts may also be used, with the aid of suitable fans.

The cooling air, after it has been channelled within the inlet 52 of duct 48, is conveyed to the suspension side 18 and wheel side 20 portions. Particularly, before being released in the areas of the housing recess 36 comprised between the pads 25 and the pistons 24, the air is advantageously channelled in duct portions that are not adjacent to the associable brake disc 8 which, following intense and repeated braking, generates a considerable heat flow from the disc to the caliper body.

After the air has been released from the cooling means outlets, it generates a flow interposing between the pads being arranged on opposite sides of the brake disc 8 and the caliper body portions 18,20, thereby preventing that the heat flow from the brake disc 8 may overheat the caliper body 16 and the brake liquid.

As may be appreciated from what has been stated above, the above disc brake caliper allows to overcome the drawbacks of the prior art disc brake caliper.

Particularly, the above caliper allows to evenly cool the caliper body, by creating an air stream between the rear wall of the pad plates, opposite the disc, and the caliper body.

Furthermore, due to the above casing system, suitable cooling ducts are provided for the caliper without having to change either the thickness or the shape of the caliper body which can be then suitably sized to withstand the most severe stress.

In other words, the casing can be applied to the caliper body without substantially changing the shape and thickness of the walls thereof, thereby ensuring high rigidity to the caliper.

Furthermore, the casing system being provided allows to create a sort of shield for the brake liquid pipe, preventing that this pipe may be subjected to shocks both in the mounting/dismounting steps of the wheel and due to bodies being accidentally raised by a rolling wheel.

Furthermore, the above casing not only can cool the caliper body, but also the brake liquid pipe connecting the suspension side and wheel side portions of the caliper, thereby further avoiding the risk that the liquid may reach the boiling point.

The solution provided allows an even distribution of the liquid flow on both caliper portions, thereby ensuring an effective cooling both at the suspension side portion and the wheel side portion. Particularly, the wheel side portion is encompassed by the wheel, and particularly the circle, being therefore subjected to high heating. The caliper according to the present invention allows to convey a cool air stream also at the wheel side portion.

Due to the embodiment providing a casing at the outer surface of one of the caliper central bridges, one can obtain a substantially balanced distribution of the amount of cooling liquid between the plate portion tangentially facing the disc leading portion and the plate portion tangentially facing the disc trailing portion; thereby, a more even distribution of the cooling liquid is obtained all over the surface of the pad plate.

Advantageously, due to the separation and reinforcement partition wall being provided at least within one of the caliper central bridges, an even greater control of distribution of the cooling liquid is obtained between the front portion and the rear portion of the plate.

The presence of a casing being associated to a surface opposite the housing recess of the brake disc, allows to provide a duct being protected from the heat flow originating from the brake disc. In this way, cool air can be directly conveyed to the wheel side caliper portion from the inlet located on the suspension side, until reaching the area comprised between the pistons and the pad plates, without the air being heated when passing near the brake disc.

In other words, the air from outside is not pre-heated while passing through the duct.

Those skilled in the art, aiming at satisfying contingent and specific requirements, will be able to carry out a number of modifications and variants to the disc brake caliper described above, all being contemplated within the scope of the inventions such as defined in the following claims.

What is claimed is:

1. In a disc brake caliper for installation astride a brake disc having a rotation axis, said caliper having a caliper body comprising a suspension side portion facing, relative to the rotation axis, a suspension element to support said caliper, a wheel side portion facing, relative to the rotation axis, a wheel associable with said brake disc, said wheel side and suspension side portions both comprising cylinders suitable to house pistons facing pads for braking the brake disc, at least one connecting bridge between said suspension side and wheel side portions, extending astride the brake disc, said portions and said connecting bridge defining a housing recess for a brake disc portion and the pads, said caliper body having an outer surface opposite said housing recess suitable to house a disc portion, the improvement comprising
   at least one casing connected to said outer surface of said caliper body opposite said housing recess, the casing forming a half shell and the outer surface of the caliper body forming a counter half shell, the half shells defining therebetween a duct extending between said suspension side and wheel side portions of the caliper body, remaining remote from said brake disc,
   said duct having at least one inlet arranged outside the caliper on the side of the suspension side portion so as to receive a cooling air stream from venting means outside said caliper, and
   cooling means on said suspension side and wheel side portions, for delivering said air stream near thrust portions of said pads affected by the respective pistons,
   said duct being connected to said cooling means, wherein said cooling means comprise ventilation ducts at least partially running through said suspension side and wheel side portions, leading to said housing recess, such as to direct cooling air towards said thrust portions of the pads being affected by the respective pistons,
   whereby the cooling air reaches the brake pads before contacting the brake disc.

2. The disc brake caliper according to claim 1, wherein said casing comprises side walls defining the duct.

3. The disc brake caliper according to claim 1, wherein at least one wall of said duct is formed by said caliper side surface.

4. The disc brake caliper according to claim 1, wherein said casing is associated to at least one end connecting bridge suitable to connect said suspension side and wheel side portions.

5. The disc brake caliper according claim 1, wherein said casing at least partially covers a brake fluid line hydraulically connecting the cylinders of the suspension side portion to the cylinders of the wheel side portion to each other.

6. The disc brake caliper according to claim 5, wherein said casing is arranged opposite the brake fluid line such that the brake fluid line is disposed between the casing and the caliper body.

7. The disc brake caliper according to claim 6, wherein said casing comprises
   a pair of branches parallel to each other and facing side surfaces of the suspension side and wheel side portions and
   a crosspiece perpendicular to said branches and facing at least one of said side connecting bridges.

8. The disc brake caliper according to claim 7, wherein the casing at said branches comprises boards provided with holes for the passage of screws or pins clamping the casing to the suspension side and wheel side portions of the caliper body.

9. The disc brake caliper according to claim 7, wherein the casing comprises said inlet at one of said branches facing the suspension side portion.

10. The disc brake caliper according to claim 9, further comprising a union at said inlet connected to an air intake in the vehicle.

11. The disc brake caliper according to claim 1, wherein the air stream passage section varies along the duct, such as to distribute the air stream in a preset manner.

12. The disc brake caliper according to claim 7, wherein said casing comprises, at each of said branches, at least one inlet for the air stream to be conveyed near the thrust portions of the pads.

13. The disc brake caliper according to claim 12, wherein said outlets arranged on the branches face ventilation ducts coaxially arranged to the cylinders of the respective suspension side and wheel side portions.

14. The disc brake caliper according to claim 12, wherein said outlets arranged on the branches face ventilation ducts arranged between adjacent cylinders of the respective suspension side and wheel side portions.

15. The disc brake caliper according to claim 1, wherein said casing is associated to at least one central connecting bridge between said suspension side and wheel side portions.

16. The disc brake caliper according to claim 15, wherein said central connecting bridge comprises a lower wall radially facing the associable brake disc and an upper wall opposite said lower wall, said casing being associated to said upper wall to provide said duct.

17. The disc brake caliper according to claim 16, wherein to said upper wall there is associated a partition wall suitable to divide said duct in at least two portions.

18. The disc brake caliper according to claim 17, wherein said partition wall is arranged substantially parallel to the axial direction such as to symmetrically divide the upper wall relative to said axial direction.

19. The disc brake caliper according to claim 15, wherein the suspension side and wheel side portions comprise pockets radially extending towards the rotation axis of the brake disc, said ventilation ducts being associated to said pockets each extending from an inlet hole to an outlet hole through said portions of the caliper body.

20. The disc brake caliper according to claim 19, wherein said cooling channels comprise a substantially radial inlet hole and a substantially axial outlet hole.

21. The disc brake caliper according to claim 19, wherein at least one of said outlet holes is located between two consecutive cylinders being arranged on the same portion of the caliper body.

22. Disc brake caliper according to claim 19, wherein said ventilation ducts are placed beside portions of the pistons radially facing the rotation axis of the brake disc.

23. The disc brake caliper according to claim 19, wherein at least one ventilation channel comprises a circular inlet hole and a slotted outlet hole, having a greater section than the inlet hole, such that the outlet cooling stream will diverge, thereby being distributed against the thrust portion of the pads.

24. The disc brake caliper according to claim 15, wherein said casing comprises a central body of main extension, extending from a wheel side end to a suspension side end, suitable to be associated to said central connecting bridge.

25. The disc brake caliper according to claim 24, wherein said central body intercepts two distinct axial ducts together with the partition wall.

26. The disc brake caliper according to claim 24, wherein said casing comprises pairs of tabs, being arranged at said wheel side and suspension side ends, suitable to convey the air stream within said ventilation ducts being located between two consecutive cylinders arranged on the same portion of the caliper body.

27. The disc brake caliper according to claim 24, wherein said casing comprises two jambs, arranged at said wheel side and suspension side ends being suitable to axially follow the profile of the wheel side and suspension side portions, said casing axially extending through a greater portion than the axial width of the caliper body.

28. The disc brake caliper according to claim 27, wherein said jambs face inlet holes being arranged at the cylinders on the side opposite the housing recess, and said ventilation ducts run through said cylinders leading to outlet holes facing the thrust portions of the pads.

29. The disc brake caliper according to claim 24, wherein said casing, at the suspension side end, comprises said inlet suitable to be connected to air intakes to receive the cooling air stream.

30. The disc brake caliper according to claim 1, wherein said cooling means comprise diffusing elements being arranged at the piston head, said diffusing elements having collars provided with holes to facilitate the heat loss at the thrust portion of the pads.

31. The disc brake caliper according to claim 1, wherein said ventilation means outside said caliper comprise means to force an air stream within said at least one inlet.

32. The disc brake caliper according to claim 1, wherein said ventilation means outside said caliper comprise air intakes taking an air stream during the forward motion of the vehicle.

33. The disc brake caliper according to claim 32, wherein said air intakes are arranged on a front portion on the vehicle.

* * * * *